United States Patent [19]

Weber et al.

[11] Patent Number: 4,826,277
[45] Date of Patent: May 2, 1989

[54] TRANSITION OF A MULTIPLE FIBER CABLE TO SINGLE FIBER CABLE

[75] Inventors: Robert N. Weber; Jeffrey A. Zeiders, both of Hummelstown, Pa.

[73] Assignee: AMP Incorporated, Harrisburg, Pa.

[21] Appl. No.: 114,970

[22] Filed: Oct. 30, 1987

[51] Int. Cl.[4] .............................................. G12B 6/44
[52] U.S. Cl. ................................ 350/96.23; 350/96.21
[58] Field of Search ............... 350/96.20, 96.21, 96.22, 350/96.23

[56] References Cited

U.S. PATENT DOCUMENTS

| | | | |
|---|---|---|---|
| 4,101,198 | 7/1978 | Heldt | 350/96.20 |
| 4,146,299 | 3/1979 | Wellington et al. | 350/96.21 |
| 4,252,406 | 2/1981 | Ryan, Jr. et al. | 350/96.21 |
| 4,611,887 | 9/1986 | Glover et al. | 350/96.21 |
| 4,626,067 | 12/1986 | Watson | 350/96.20 |
| 4,645,295 | 2/1987 | Pronovost | 350/96.20 |
| 4,759,599 | 7/1988 | Yamaguchi et al. | 350/96.21 |
| 4,762,388 | 8/1988 | Tanaka et al. | 350/96.20 |

Primary Examiner—William L. Sikes
Assistant Examiner—Frank González
Attorney, Agent, or Firm—Gerald K. Kita

[57] ABSTRACT

A transition 1 of a multiple fiber cable 2 to one or more single fiber cables 4,4 includes, a multiple fiber cable 2 comprising an outer sheath 10 and strength members 11 and multiple optical fibers 3,3 contained in and sheathed by the outer sheath 10, one or more of the multiple optical fibers 3,3 extending from the multiple fiber cable 2 as one or more unsheathed optical fibers 8,8, single fiber cables 4,4 corresponding in number with the one or more unsheathed optical fibers 8,8, strain relief means 6,6,6 assembled to the outer sheaths 10,10,10 and to the strength members 11,11,11 of the cables 2,4,4, and each unsheathed optical fiber 8,8 extending within the outer sheath 10,10 of a corresponding single fiber cable 4,4 and substituting for an optical fiber 3,3 of the corresponding single fiber cable 4,4.

9 Claims, 4 Drawing Sheets

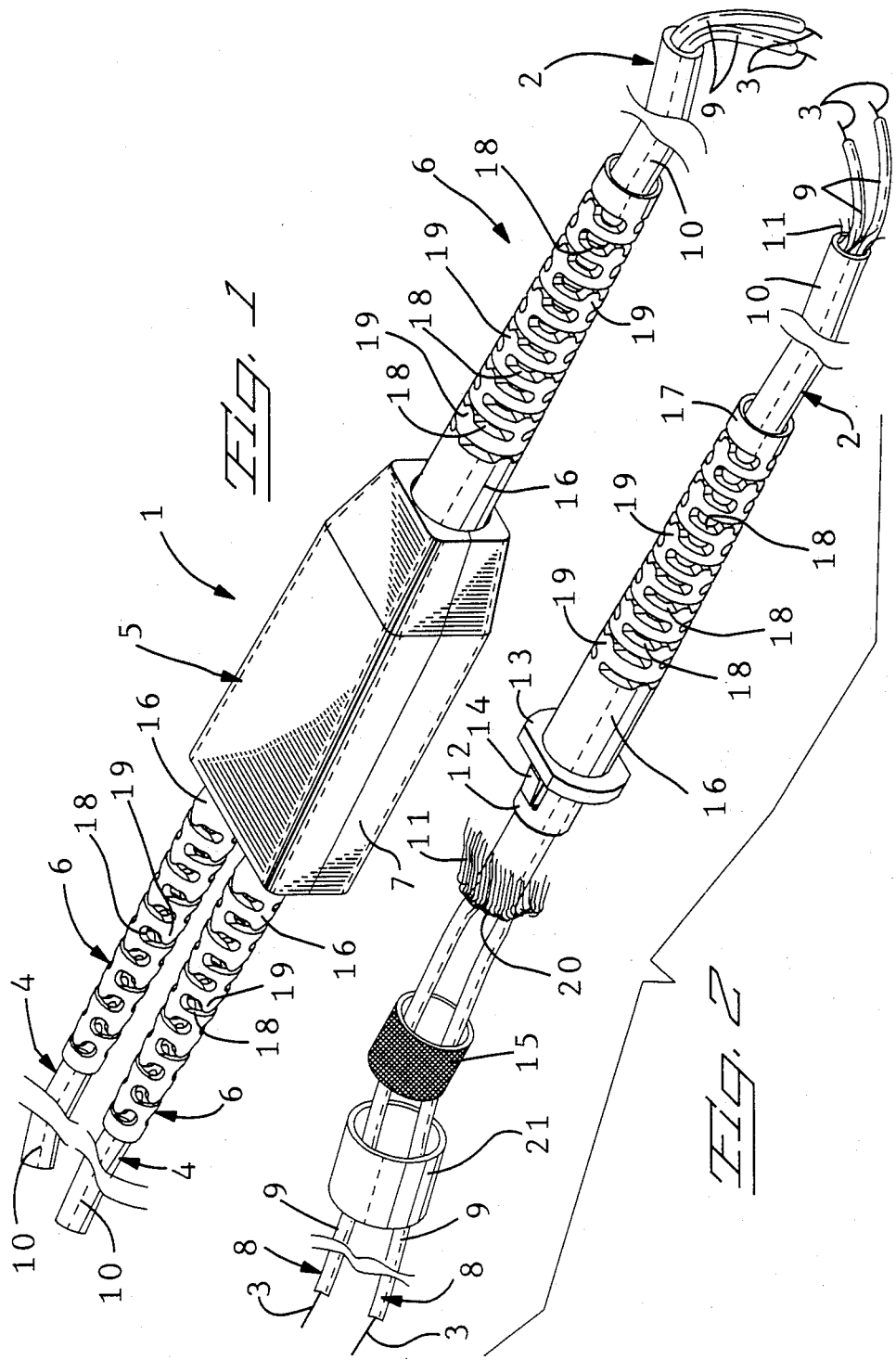

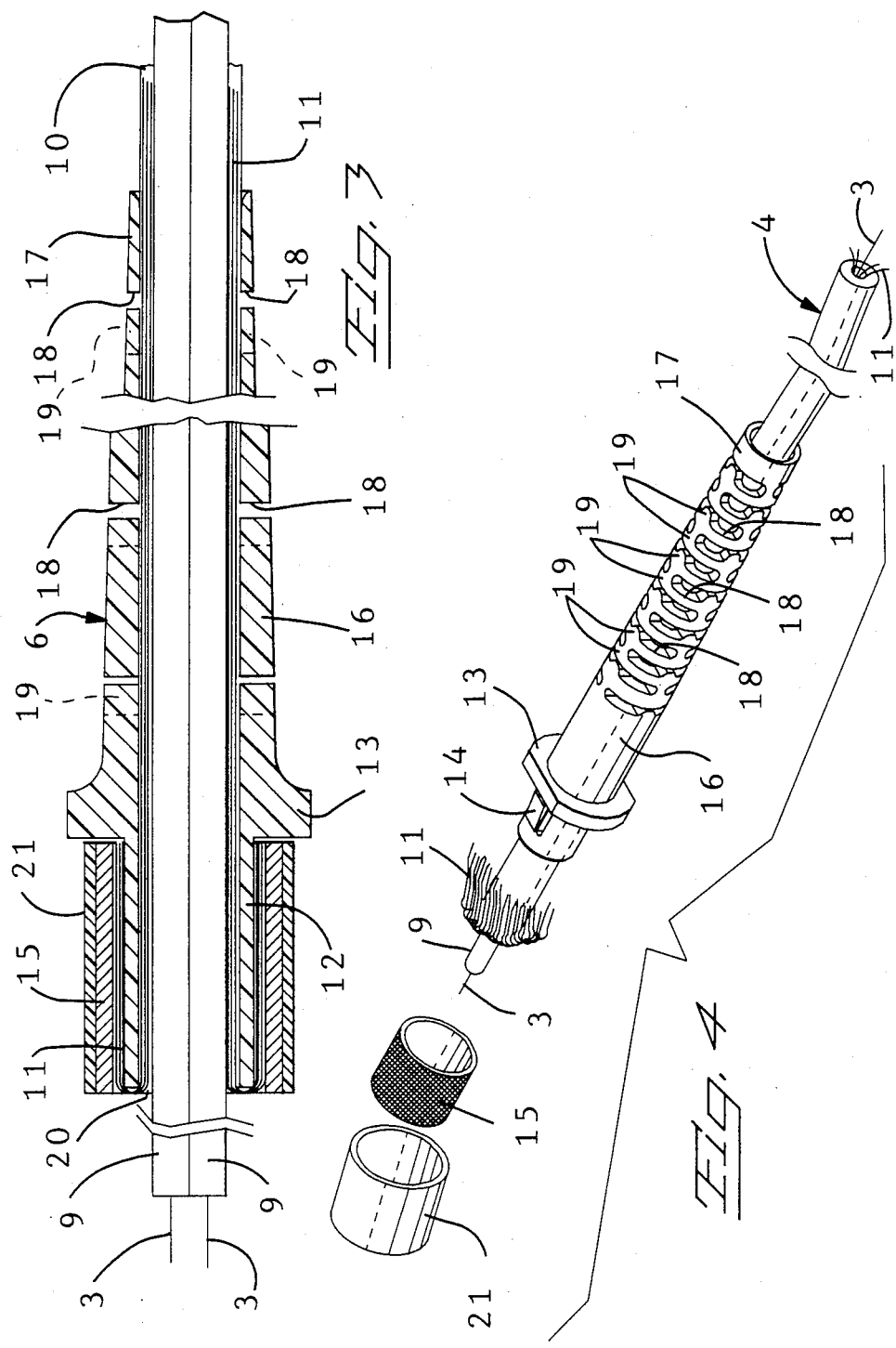

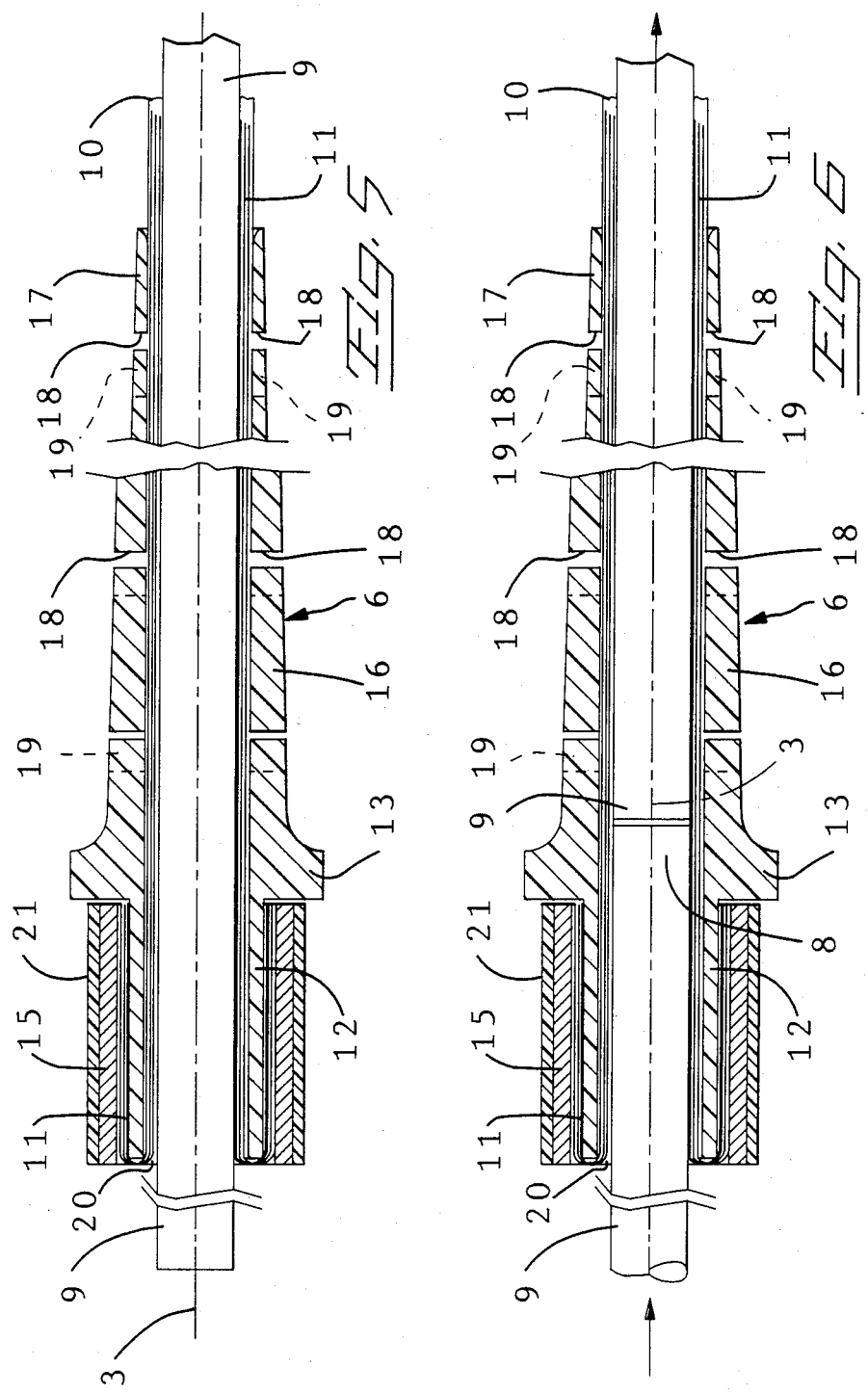

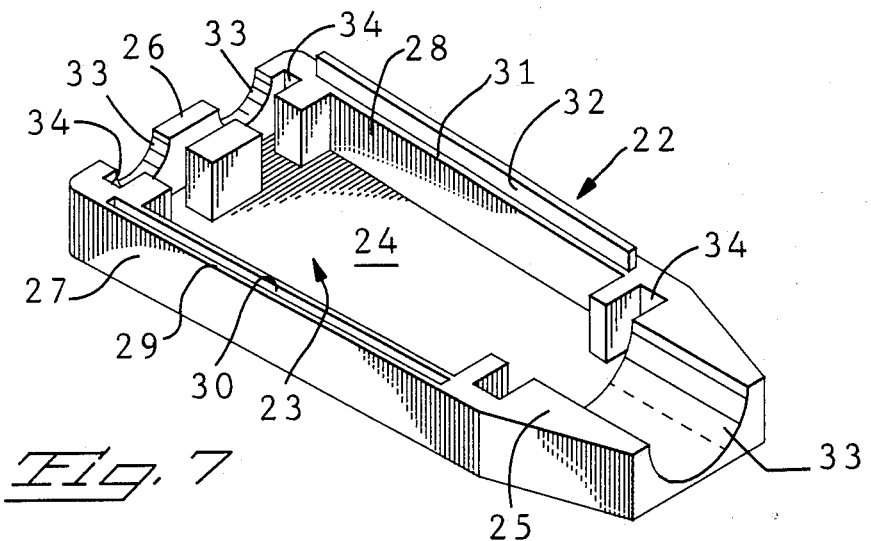
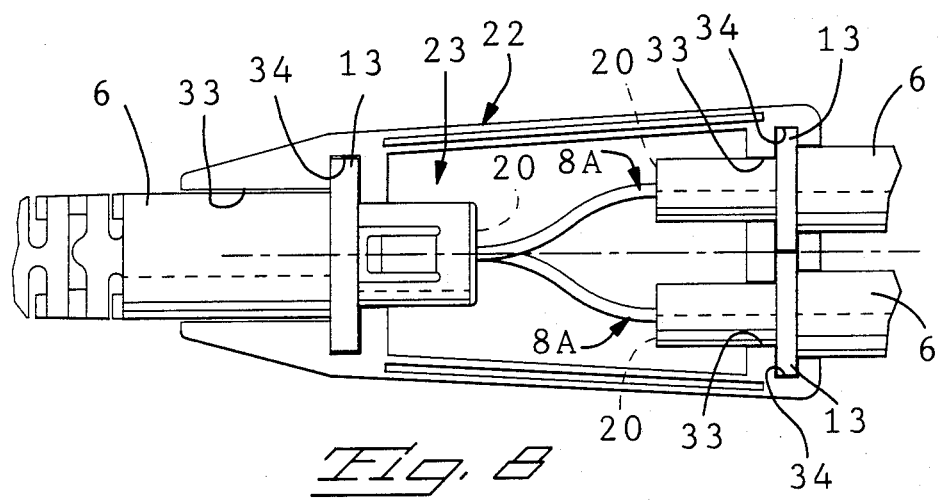
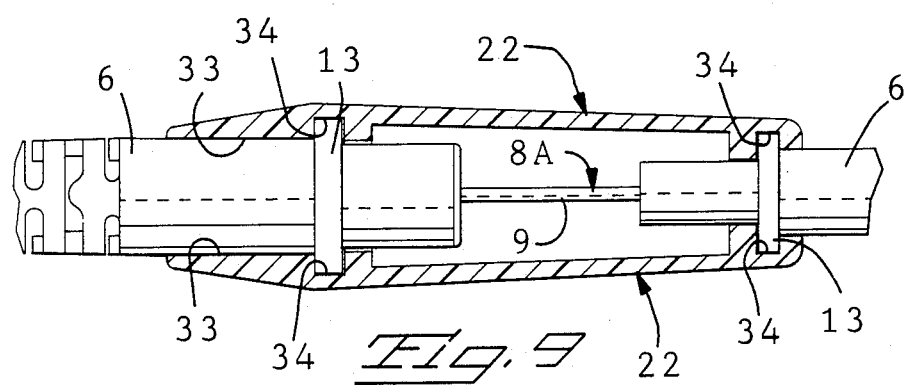

TRANSITION OF A MULTIPLE FIBER CABLE TO SINGLE FIBER CABLE

FIELD OF THE INVENTION

The invention relates to a transition of a multiple fiber cable to single fiber cable, and more particularly, to a transition wherein one or more optical fibers of a multiple fiber cable extend from the multiple fiber cable and become corresponding single fiber cables.

BACKGROUND OF THE INVENTION

An optical cable is constructed with one or more optical fibers contained within a single, flexible outer sheath. Each fiber includes a light transmissive core encircled concentrically by cladding, a material with an optical index of refraction less than that of the core. An optical signal propagating within the core is retained in the core by refraction at the boundary of the core against the cladding. A bend in an optical fiber establishes a change in the angle of incidence of the optical signal with the boundary, allowing some of the signal to escape as a loss in signal rather than to refract and remain internally of the core of the fiber. To reduce losses of optical signals due to bending of the fiber, the cable is constructed to resist bending of the fiber beyond a minimum radius of curvature. For example, the cable is constructed such that each fiber is engaged by and is concentrically encircled by a flexible buffer. In turn, the buffer is encircled by an outer flexible sheath. The buffer is a solid polymeric material having an outer diameter many times larger than the diameter of the encircled fiber. When bending forces are applied the the cable, the buffer and the outer sheath are flexible and tend to bend in an arc, thereby resisting a tendency for the cable to bend acutely beyond a minimum radius of curvature.

An optical cable constructed with a single buffer covered optical fiber is known as a single fiber cable. An optical cable constructed with two or more buffer covered optical fibers is known as a multiple fiber cable. Each fiber is slender and is easily fractured when subjected to tensile force. To resist a tensile force that might fracture each fiber of an optical cable, the cable is constructed with elongated strength members contained in the sheath of the cable and extending axially of each fiber. The strength members project between the sheath and the buffer covered fibers. For example, the strength members are elongated slender fibers of a high tensile strength material, such as Kevlar, a trademark of E. I. du Pont de Nemours & Company, Wilmington, Del.

It is often desired to provide a breakout in a multiple fiber cable. A breakout is defined as a transition along a multiple fiber cable wherein one or more optical fibers leave the multiple fiber cable and become single fiber cables that are capable of being routed to individual locations. Prior to the invention a breakout was accomplished according to the following procedure. First, the outer sheath was opened at a location where the breakout was desired, thereby to expose one or more buffer covered, unsheathed fibers together with some strands of the strength members. A single fiber cable was constructed around each unsheathed fiber and some strands of the strength members. The strength members were separated into groups and were apportioned among the unsheathed fibers, whereby a group of some of the strength members accompanied each unsheathed fiber. Each unsheathed fiber and a group of some of the strength members were inserted into open ends of flexible tubing and were assembled in and along the tubing, thereby to simulate the construction of a single fiber cable. Adhesive backed tape was wound around portions of the unsheathed fibers extending between the open ends of the tubing and the opened outer sheath of the multiple fiber cable.

The prior transition has been unsatisfactory. For example, inserting the unsheathed fibers and the strength members along tubing has been a difficult and time consuming task. Accordingly, there has been a need for a transition that is constructed with relative ease. In addition, the unsheathed fibers of the prior transition have been susceptible to excessive bending where the unsheathed fibers extend between the multiple fiber cable and open ends of the tubing. Accordingly, there has been a need for a transition to include strain relief means for preventing excessive bending of unsheathed fibers extending from the multiple fiber cable to the single fiber cables.

In the prior transition, adhesive tape was applied to cover the unsheathed fibers and open ends of the tubing. The adhesive tape formed a mass of unpredictable size and shape. The fibers were unconstrained by the tape and projected from the transition in unpredictable directions. Thereby, the size and shape of the prior transition has been unpredictable. There has been a need for a transition along a multiple fiber cable, which transition has a predictable construction, size and shape.

SUMMARY OF THE INVENTION

The invention provides a transition along a multiple fiber cable wherein one or more optical fibers leave the multiple fiber cable and become corresponding single fiber cables. The invention further provides a transition including strain relief means where unsheathed fibers extend between the multiple fiber cable and the single fiber cables. The invention reduces the tendency or the susceptibility of the unsheathed fibers to bend excessively as was permitted by the adhesive backed tape of the prior transition. Further the invention provides a transition constructed with a predictable size and shape, in sharp contrast to the unpredictable construction of the prior transition.

The invention further provides a transition of a multiple fiber cable into single fiber cables, wherein the transition is constructed by; extending one or more unsheathed optical fibers of a multiple fiber cable from a remainder of the multiple fiber cable, assembling strain relief means to an outer sheath and to strength members of the remainder of the multiple fiber cable, and to an outer sheath and to strength members of each of one or more single fiber cables corresponding in number with the number of unsheathed optical fibers, and substituting an optical fiber of each single fiber cable with a corresponding unsheathed optical fiber, whereby each unsheathed optical fiber is assembled with the outer sheath and the strength members of a corresponding single fiber cable. The invention overcomes difficulties associated with the use of tubing to construct single fiber cables around unsheathed optical fibers.

Other advantages and results of the invention are apparent from a following detailed description by way of example of the invention and from accompanying drawings.

DESCRIPTION OF THE DRAWINGS

FIG. 1 is an enlarged fragmentary perspective view of a transition wherein optical conductors of a multiple fiber cable extend from the multiple fiber cable and become corresponding single fiber cables.

FIG. 2 is an enlarged fragmentary perspective view with parts in exploded configuration to illustrate details of a multiple fiber cable and corresponding strain relief means.

FIG. 3 is a fragmentary elevation view in section of an assembly of the cable and strain relief means of FIG. 2.

FIG. 4 is an enlarged fragmentary perspective view with parts in exploded configuration to illustrate details of a single fiber cable and corresponding strain relief means.

FIG. 5 is a fragmentary elevation view in section of an assembly of the cable and strain relief means shown in FIG. 4.

FIG. 6 is an enlarged fragmentary elevation view in section of the assembly shown in FIG. 5, further illustrating replacement of an optical fiber of the single fiber cable with an unsheathed optical fiber of the multiple fiber cable.

FIG. 7 is a perspective view of a shell portion of a strain relief means.

FIG. 8 is a plan view in section of the transition shown in FIG. 1.

FIG. 9 is an elevation view in section of the transition shown in FIG. 1.

DETAILED DESCRIPTION OF THE INVENTION

With more particular reference to the drawings, FIG. 1 shows a transition 1 of a multiple fiber cable 2 wherein, optical fibers 3,3 of a multiple fiber cable extend from the multiple fiber cable 2 and become corresponding single fiber cables 4,4. Strain relief means 5 of the transition 1 include strain relief members 6,6,6 covering corresponding cables 2,4,4 and a shell 7 joined to the strain relief members 6,6,6.

With reference to FIGS. 1 and 2, the multiple fiber cable 2 is constructed with multiple elongated optical fibers 3,3. One or more of the multiple fibers 3,3 extend from the cable 2 as one or more unsheathed optical fibers 8,8. As shown in FIGS. 1, 4 and 5, one or more single fiber cables 4,4 correspond in number with the one or more unsheathed optical fibers 8,8. Each single fiber cable 4,4 is constructed with a single elongated optical fiber 3.

Each optical fiber 3,3,3 includes an optically transmissive core concentrically encircled by an elongated buffer 9,9,9 that is constructed as a cylindrical sleeve of a known flexible, solid polymeric material. Each buffer 9,9,9 has an outside diameter many times larger than the diameter of a corresponding core of the fiber 3,3,3 covered by the buffer 9,9,9. Each cable 2,4,4 includes a single, flexible and elongated outer sheath 10,10,10 constructed of a known, flexible and tough solid polymeric material. The corresponding buffers 9,9 of the multiple fiber cable 2 are contained within and sheathed by a corresponding sheath 10. Each buffer 9,9 of a corresponding single fiber cable 4,4 is contained within a corresponding sheath 10,10.

To resist tensile force that might fracture each fiber 3,3,3, elongated strength members are contained in each corresponding sheath 10,10,10. The strength members 11,11,11 are slender flexible strands of a material of high tensile strength, for example, a polymeric material identified previously as Kevlar. The strength members 11,11,11 extend axially of each corresponding sheath 10,10,10 and axially of each corresponding buffer covered fiber 3,3,3. The strength members 11,11,11 are distributed over the inside diameter of each corresponding sheath 10,10,10 and are located between the inside diameter of each sheath 10,10,10 and the corresponding single or the corresponding one or more, buffer covered fibers 3,3,3 within the sheath 10,10,10 and The strain relief means 5 includes a strain relief member 6,6,6 for each corresponding cable 2,4,4. Each strain relief member 6,6,6 has a cylindrical and substantially rigid front end 12,12,12 and an encircling externally projecting flange 13,13,13 adjacent to the front end 12,12,12. Each front end 12,12,12 includes one or more external and radially projecting projections 14,14,14. A knurled metal sleeve 15,15,15 is adapted for assembly with the front end 12,12,12 of each corresponding strain relief member 6,6,6. For example, each sleeve 15,15,15 concentrically encircles the front end 12,12,12 of the corresponding strain relief member 6,6,6 with a compression fit against each projection 14,14,14 of the front end 12,12,12.

Each strain relief member 6,6,6 includes a sleeve 16,16,16 with an exterior that is externally tapered to a free end 17,17,17. A series of elongated slots 18,18,18 extend transversely of the axis of the corresponding sleeve 16,16,16 and through the thickness of each sleeve 16,16,16. A projection 19,19,19 extends from a lateral side of each slot 18,18,18 and into each slot 18,18,18 and toward an opposite lateral side of the corresponding slot 18,18,18.

Each strain relief member 6,6,6 is applied concentrically over a corresponding cable 2,4,4. A portion of the corresponding sheath 10,10,10 of each cable 2,4,4 is severed and removed to provide a front end 20,20,20 of each sheath 10,10,10, and to provide projecting lengths of the strength members 11,11,11 projecting from the corresponding front end 17,17,17 of the sheaths 10,10,10. Unsheathed fibers 8,8 that are buffer covered extend from a front end 20,20,20 of each corresponding sheath 10,10,10. For example, one or more of the optical fibers 3,3 of the multiple fiber cable 2 extend from a remainder of the multiple fiber cable 2 as one or more unsheathed optical fibers 8,8. Lengths of the unsheathed fibers 8,8 as long as 18 inches or 45.7 centimeters project from the front end 17 of the sheath 10 of the multiple fiber cable 2.

Each strain relief member 6,6,6 is assembled to a corresponding cable 2,4,4. For example, each strain relief member 6,6,6 is displaced axially along a corresponding cable 2,4,4 and positioned with the front end 12,12,12 concentrically surrounding the front end 20,20,20 of the corresponding sheaths 10,10,10. The projecting lengths of the strength members 11,11,11 are doubled back on themselves to overlap concentrically the front end 12,12,12 of the corresponding strain relief members 6,6,6. The projecting lengths of the strength members extend rearwardly toward the corresponding flanges 13,13,13 and are trimmed to length at the location of the corresponding flanges 13,13,13. Each metal sleeve 15,15,15 is assembled over a corresponding front end 12,12,12. Each metal sleeve 15,15,15 and corresponding front end 12,12,12 clamp the projecting lengths of the corresponding strength members 11,11,11. Adhesive, not shown, is applied to bond together the strength members 11,11,11 and the corresponding sleeves 15,15,15 and the corresponding front ends 20,20,20, and to bond together the outer sheaths 10,10,10 of each corresponding cable 2,4,4 to corresponding strain relief members 6,6,6. Thereby, the strength members 11,11,11 and each outer sheath 10,10,10 are secured and assembled to a corresponding strain relief member 6,6,6. An insulative sleeve 21,21,21 can be assembled concentrically over each corresponding knurled metal sleeve 15,15,15 and bonded in place with adhesive.

Each buffer covered optical fiber 3,3 of the one or more single fiber cables 4,4 is substituted with a corresponding unsheathed optical fiber 8,8 extending from or projecting from the multiple fiber cable 2. For example, with reference to FIG. 6, an end of an unsheathed optical fiber 8, buffer covered, is aligned with and engaged against an end of a single, buffer covered optical fiber 3 of a corresponding single fiber cable 4. As the single, buffer covered optical fiber 3 is withdrawn slidably in increments of movement from within the sheath 10 of the single fiber cable 4, the unsheathed optical fiber 8 is inserted slidably into and along the sheath 10 in increments of movement corresponding to the increments of movement of the single, buffer covered optical fiber 3 being removed from the sheath 10. The increments of movement are repeated until the unsheathed optical fiber 8 is extended within the outer sheath 10 of the corresponding single fiber cable 4, and displaces the single, buffer covered optical fiber 3 out of the sheath 10. The unsheathed optical fiber 8 readily is assembled slidably into and along the sheath 10 of the corresponding single fiber cable 4, particularly because the single, buffer covered optical fiber 3 serves as a mandrel within the sheath 10 to resist radial collapse of the sheath 10 and to resist collapse of the strength members 11 into the path of insertion of the unsheathed optical fiber 8. The strength members 11 of the single fiber cable 4 remain in the sheath 10 and remain secured to the associated strain relief member 6,7. The unsheathed optical fiber 8 extends within the sheath 10 of the corresponding single fiber cable 4 and substitutes for the displaced single, buffer covered optical fiber 3 of the single fiber cable 4. The displaced single, buffer covered optical fiber 3 is discarded.

The shell 7 of the strain relief means 5 is of bipartite construction. In FIGS. 7, 8 and 9, there is shown an identical pair of shell portions 22,22, each including an open side 23, a bottom wall 24 opposite the open side 23 and further including, projecting from the bottom wall 24, projecting opposite end walls 25,26 and projecting opposite sidewalls 27,28 connected between the end walls 25,26. An elongated edge 29 of one said sidewall 27 has an elongated recess 30. An elongated edge 31 of the other sidewall 28 has a projecting elongated lip 32. When the two shell portions 22,22 are assembled together, open side 23 to open side 23, the lip 32,32 of each corresponding shell portion 22,22 will nest in the recess 30,30 of the other corresponding shell portion 22,22, thereby to interlock the shell portions 22,22 together.

Passage portions 33,33,33 corresponding to each of the strain relief members 6,6,6 associated with the corresponding cables 2,4,4, above described, extend through corresponding end walls 25,26 of each shell portion 22,22 and extend along the corresponding open sides 23,23. Elongated recesses 34,34,34 in corresponding end walls 25,26 extend transversely of corresponding passage portions 33,33,33 and extend along the corresponding open sides 23,23 for receiving the corresponding flanges 13,13,13 of the strain relief members 6,6,6. For example, the strain relief member 6 associated with the multiple fiber cable 2 will nest in the corresponding passage portion 33,33 in the end wall 25,25 of each shell portion 22,22. The flange 13 will nest in the corresponding recess 34,34 in the end wall 25,25 of each shell portion 22,22. Further, for example, the strain relief members 6,6 associated with each corresponding single fiber cable 4,4, above described, will nest in the corresponding passage portions 33,33 in each end wall 26,26 of each shell portion 22,22. The flanges 13,13 of the strain relief members 6,6 associated with each corresponding single fiber cable 4,4, above described, will nest in the corresponding recesses 34,34 in the end wall 26,26 of each shell portion 22,22. The two shell portions 22,22 are assembled together to encircle the strain relief members 6,6,6 and to encircle the flanges 13,13,13, and further, to form the shell 7 and to secure the strain relief members 6,6,6 to the shell 7 and resist movement of the cables 2,4,4 with respect to the shell 7. The unsheathed fibers 8,8 include portions 8A,8A extending between the multiple fiber cable 2 and the single fiber cables 4,4. The shell 7 contains and protects these portions 8A,8A. Advantageously, these portions are maintained in slackened condition, and curved with large radii of curvature. The portions 8A,8A are free of tensile forces, because the cables 2,4,4 are secured to the associated strain relief members 6,6,6 that are, in turn, secured to the shell 7 at fixed positions. The strain relief members 6,6,6 are capable of being bent in corresponding arcs adjacent the ends 17,17,17 and will resist the tendency of the fibers 3,3,3 in the cables 2,4,4 to be bend excessively adjacent the strain relief means 5. When a corresponding strain relief member 6,6,6 is bent to an arc, the slots 18,18,18 located along the inside radius of the arc will decrease in width until the projections 19,19,19 in these corresponding slots 18,18,18 engage the opposing sides of the slots 18,18,18, thereby to prevent a kink in the strain relief member 6,6,6 and to distribute the tendency for bending of the strain relief member 6,6,6 along the length of the strain relief member 6,6,6.

The invention provides a transition 1 along a multiple fiber cable 2 wherein one or more optical fibers 3,3 leave the multiple fiber cable 2 and become corresponding single fiber cables 8,8. The invention further provides a transition 1 including strain relief means 5 where unsheathed fibers 8,8 extend between the multiple fiber cable 2 and the single fiber cables 4,4. The invention reduces the tendency or the susceptibility of the unsheathed fibers 8,8 to bend excessively. Further the invention provides a transition 1 constructed with a predictable size and shape. The invention further provides a transition 1 of a multiple fiber cable 2 into single fiber cables 4,4, wherein the transition 1 is constructed by; extending one or more unsheathed optical fibers 8,8 of a multiple fiber cable 2 from a remainder of the multiple fiber cable 2, assembling strain relief means 5 to an outer sheath 10 and to strength members 11 of the remainder of the multiple fiber cable 2, and to an outer sheath 10,10 and to strength members 11,11 of each of one or more single fiber cables 2,2 corresponding in number with the number of unsheathed optical fibers 8,8, and substituting an optical fiber, buffer covered, 3,3 of each single fiber cable 4,4 with a corresponding unsheathed optical fiber 8,8, whereby each unsheathed optical fiber 8,8 is assembled with the outer sheath 10,10 and the strength members 11,11 of a corresponding single fiber cable 4,4. The invention overcomes difficulties associated with the use of tubing to construct single fiber cables around unsheathed optical fibers.

Other advantages of the invention are apparent from the detailed description by way of example, and from accompanying drawings, and from the spirit and scope of the appended claims.

We claim:

1. A method for providing a transition of a multiple fiber cable to single fiber cable, comprising the steps of:

extending at least one unsheathed optical fiber of a multiple fiber cable from a remainder of the multiple fiber cable, assembling strain relief means of an outer sheath and to strength members of the remainder of the multiple fiber cable and further to an outer sheath and to strength members of a single fiber cable corresponding to each said unsheathed optical fiber, and substituting each optical fiber of each said single fiber cable with a corresponding unsheathed optical fiber, whereby each corresponding unsheathed optical fiber is assembled with the outer sheath and the strength members of a corresponding single fiber cable.

2. A method as recited in claim 1, and further including the step of;

removing a portion of the multiple fiber cable from a remainder of the multiple fiber cable to provide said at least one unsheathed optical fiber extending from the remainder of the multiple fiber cable.

3. A method as recited in claim 1, wherein the strain relief means is assembled by the further steps of;

assembling a strain relief member to an outer sheath and to the strength members of the remainder of the multiple fiber cable, and assembling a corresponding strain relief member to an outer sheath and to strength members of each said single fiber cable.

4. A transition of an optical cable having multiple optical fibers to at least one single fiber cable comprising;

a multiple fiber cable comprising an outer sheath and strength members and multiple optical fibers contained in and sheathed by the outer sheath, at least one of the multiple optical fibers extending from the multiple fiber cable as an unsheathed optical fiber, a single fiber cable corresponding to each unsheathed optical fiber, strain relied means assembled to the outer sheath and to the strength members of the multiple fiber cable, the strain relief means being assembled to an outer sheath and to strength members of each said single fiber cable, each said unsheathed optical fiber projecting from the outer sheath of the multiple fiber cable, and each said unsheathed optical fiber extending within the outer sheath of a corresponding single fiber cable and substituting for an optical fiber of the corresponding single fiber cable.

5. A transition as recited in claim 4, wherein a portion of each said unsheathed optical fiber extends between the multiple fiber cable and the corresponding single fiber cable and is covered by the strain relief means.

6. A transition as recited in claim 4 or 5, wherein a portion of each said unsheathed optical fiber extending between the multiple fiber cable and the corresponding single fiber cable is maintained in slackened condition.

7. A transition as recited in claim 4, wherein each said unsheathed optical fiber includes a corresponding buffer encircling a corresponding optical fiber.

8. A transition as recited in claim 4, wherein, the strain relief means includes strain relief members encircling corresponding cables and secured to corresponding cables, and a shell secured to the strain relief members.

9. A transition as recited in claim 4, wherein, the strain relief means includes strain relief members encircling corresponding cables and secured to corresponding cables, and a shell secured to the strain relief members, the shell containing a portion of each said unsheathed optical fiber extending between the multiple fiber cable and the corresponding single fiber cable.

* * * * *